(12) United States Patent
Nakamura et al.

(10) Patent No.: US 8,369,067 B2
(45) Date of Patent: Feb. 5, 2013

(54) ELECTRICITY FEEDING CONTROL DEVICE

(75) Inventors: Shinichi Nakamura, Tsu (JP); Kouji Kakiuchi, Tsu (JP); Tatsuya Mukai, Tsu (JP); Shiro Mori, Tsu (JP); Hirotoshi Watanabe, Tsu (JP); Naoki Fukuo, Tsu (JP); Yoji Minami, Nagoya (JP); Kazuhiro Kondou, Aichi-gun (JP)

(73) Assignees: Panasonic Corporation, Osaka (JP); Toyota Jidosha Kabushiki Kaisha, Aichi-ken (JP)

( * ) Notice: Subject to any disclaimer, the term of this patent is extended or adjusted under 35 U.S.C. 154(b) by 155 days.

(21) Appl. No.: 12/948,205

(22) Filed: Nov. 17, 2010

(65) Prior Publication Data

US 2011/0122548 A1 May 26, 2011

(30) Foreign Application Priority Data

Nov. 20, 2009 (JP) ................................ 2009-264921

(51) Int. Cl.
*H02B 1/26* (2006.01)
(52) U.S. Cl. ........ 361/626; 361/628; 361/631; 361/643; 361/676; 361/819; 363/141; 307/10.1; 324/522; 324/764.01
(58) Field of Classification Search .................. 361/601, 361/605, 611, 621–622, 626–628, 641, 643, 361/647–648, 704, 707, 712, 713, 715, 816, 361/819, 827, 837
See application file for complete search history.

(56) References Cited

U.S. PATENT DOCUMENTS

| | | | | |
|---|---|---|---|---|
| 6,081,425 A * | 6/2000 | Cheng | ........................... | 361/704 |
| 6,977,518 B2 * | 12/2005 | Higashihama et al. | .. | 324/764.01 |
| 7,492,597 B2 * | 2/2009 | Huang | ........................... | 361/719 |
| 7,733,647 B2 * | 6/2010 | Lee | ................. | 361/690 |
| 7,843,684 B2 * | 11/2010 | Lu et al. | .................... | 361/679.47 |
| 2004/0144527 A1 * | 7/2004 | Yang et al. | ..................... | 165/185 |
| 2004/0227521 A1 * | 11/2004 | Higashihama et al. | ........ | 324/522 |
| 2009/0116188 A1 * | 5/2009 | Fong et al. | .................... | 361/695 |
| 2009/0326727 A1 * | 12/2009 | Gothard | ........................ | 700/292 |
| 2011/0204715 A1 * | 8/2011 | Nakamura et al. | ........... | 307/10.1 |
| 2011/0204849 A1 * | 8/2011 | Mukai et al. | .................. | 320/111 |

FOREIGN PATENT DOCUMENTS

JP 2009-234392 A 10/2009

* cited by examiner

*Primary Examiner* — Courtney Smith
(74) *Attorney, Agent, or Firm* — Cheng Law Group, PLLC (57) ABSTRACT

An electricity feeding control device is provided with an air hole (31c) which is formed by penetrating a part of a peripheral wall of a body (31) constituting a part of a housing case (3). The housing case (3) is provided in its inside with an inner pressure adjusting sheet (5), formed with a breathable and waterproof member, and arranged so as to cover the air hole (31c) from the inside of the housing case (3). The air hole (31c) comprises a long recess (31c2) formed in an outer surface of the body (31), a communicating hole (31c1) consecutively formed in one end of a longi-tudinal direction of the recess (31c2) and communicated with an inner surface of the body (31), and a shielding plate (33) attached in the outer surface of the body (31) so as to cover a region other than the other end of the longitudinal direction of the recess (31c2), in a region of an opening section (31c3) of the recess (31c2). That is, a channel of the air hole (31c), led from the inside to the outside of the housing case (3), is formed into a nonlinear shape.

5 Claims, 6 Drawing Sheets

ELECTRICITY FEEDING CONTROL DEVICE

TECHNICAL FIELD

The invention relates generally to an electricity feeding control device for an electrical automobile.

BACKGROUND ART

Figure 4:
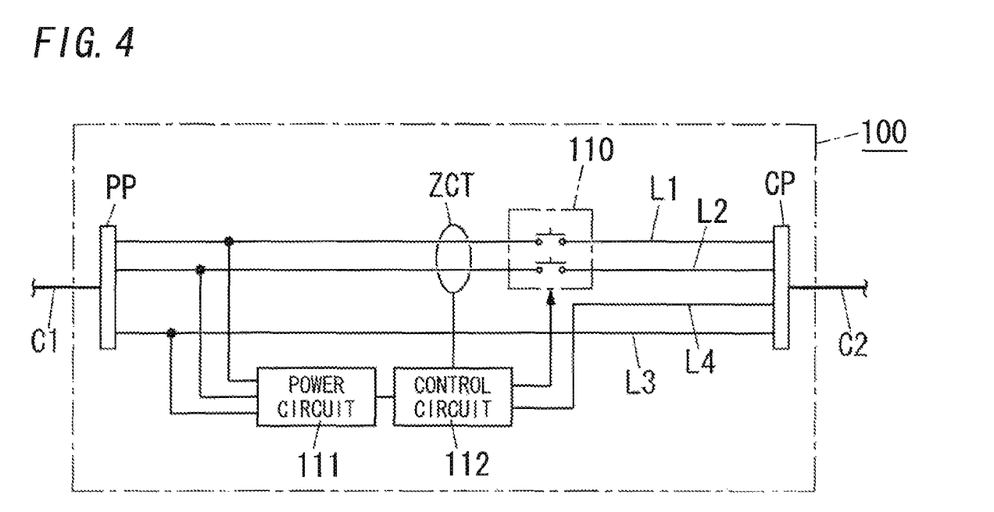
FIG. 4 is a schematic circuit diagram of a conventional electricity feeding control device.

In the past, as shown in FIG. 4, there have been proposed an electricity feeding control device 100, which controls power feeding from an external power source (not shown) to an electrical automobile (not shown) comprising a battery (not shown) and a charge circuit (not shown) for charging the battery (for example, see Japanese Patent Application Laid-Open No. 2009-234392). Then, this electricity feeding control device 100 comprises a relay 110, a residual current transformer ZCT, and a control circuit 112. The relay 110 is inserted into, respectively, a first power feeding line L1 and a second power feeding line L2, which constitute a part of a power feeding channel leading from the external power source to the charge circuit, and opens and closes the first and second power feeding lines L1, L2. The residual current transformer ZCT is located between the relay 110 and the below-described power side plug PP, and is penetrated by the first and second power feeding lines L1, L2. The control circuit 112 switches off the relay 110, when detecting a leakage based on an output (that is, unbalance current) of the residual current transformer ZCT.

Figure 5:
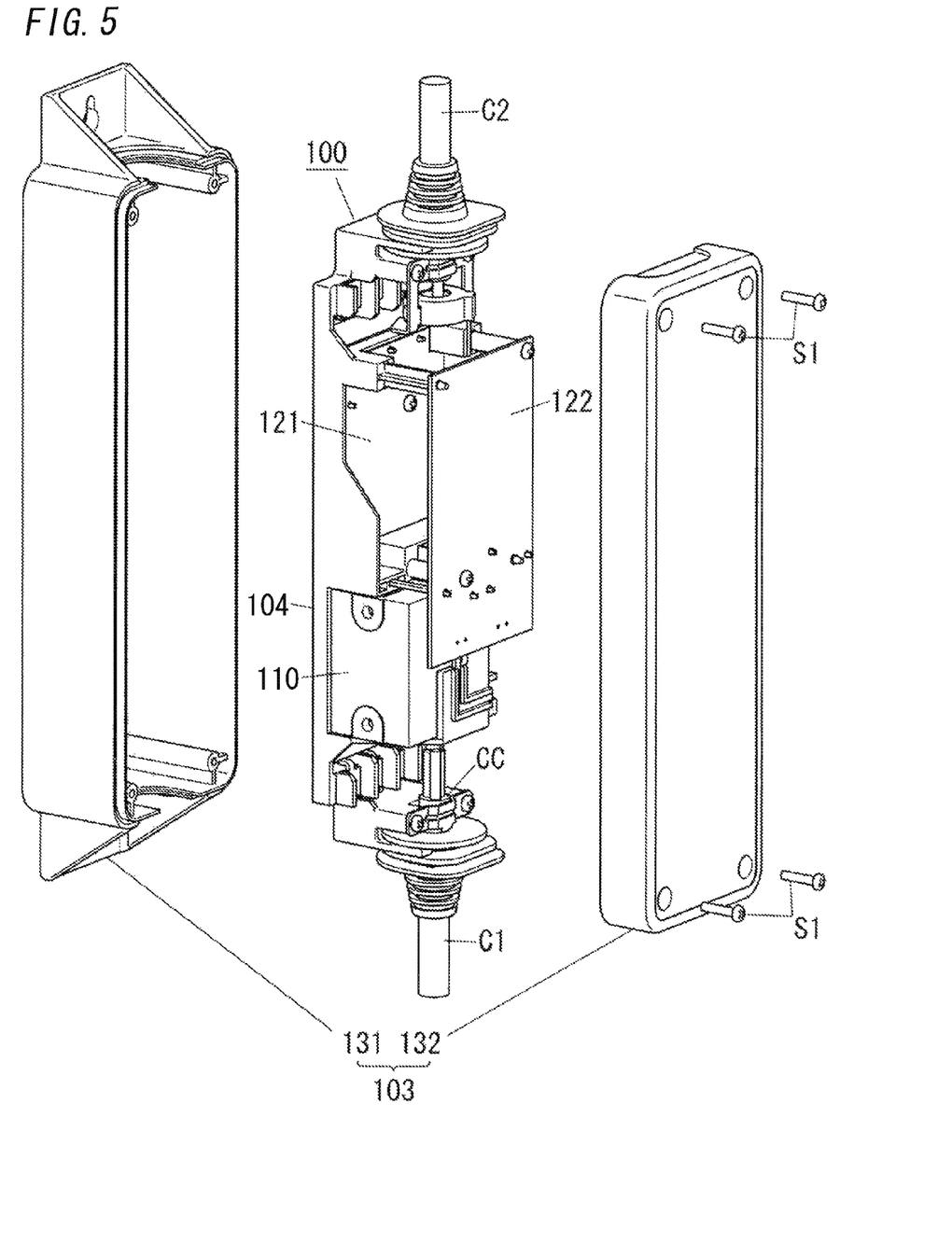
FIG. 5 is an exploded perspective view of said conventional electricity feeding control device.

The electricity feeding control device 100, having a configuration shown in FIG. 4, comprises a power side plug PP connected to the external power source via a first cable C1 (see FIG. 5), and a car side plug CP connected to the electrical automobile via a second cable C2 (see FIG. 5). Then, the power side plug PP is electrically connected to the car side plug CP through the first and second power feeding lines L1, L2. In addition, the electricity feeding control device 100, having a configuration shown in FIG. 4, comprises a power circuit 111 for supplying power to the control circuit 112. The power side plug PP and the car side plug CP are provided with ground terminals (not shown) which are grounded, respectively, and these ground terminals are connected each other through a grounding wire L3. By the way, the charge circuit of the electrical automobile generates a relay control signal for causing the control circuit 112 to switch on/off the relay 110. Then, the relay control signal is inputted to the car side plug CP in the electricity feeding control device 100 through the second cable C2. In the electricity feeding control device 100, by contrast, the car side plug CP and the control circuit 112 are connected each other through a signal line L4, and the relay control signal, inputted to the car side plug CP, is transmitted to the control circuit 112 through the signal line L4.

In this electricity feeding control device 100, as shown in FIG. 5, a first base plate 121 in which the power circuit 111 is formed, a second base plate 122 in which the control circuit 112 is formed, and the relay 110 are attached to a supporting member 104, and are housed within a box-shaped housing case 103.

The housing case 103 comprises a body 131 which is formed into a box-shape of about a rectangular parallelepiped and of which one face is opened, and a cover 132 which is formed into a box-shape of about a rectangular parallelepiped and of which one face is opened. Then, the cover 132 is attached to the opened one face of the body 131 with attachment screws S1.

By the way, this kind of electricity feeding control device is mainly used out of doors. Therefore, the housing case 103 is cooled during nighttime or winter-time in which the air temperature drops, and thus there is a possibility that a dew condensation is generated within the housing case 103.

Figure 6:
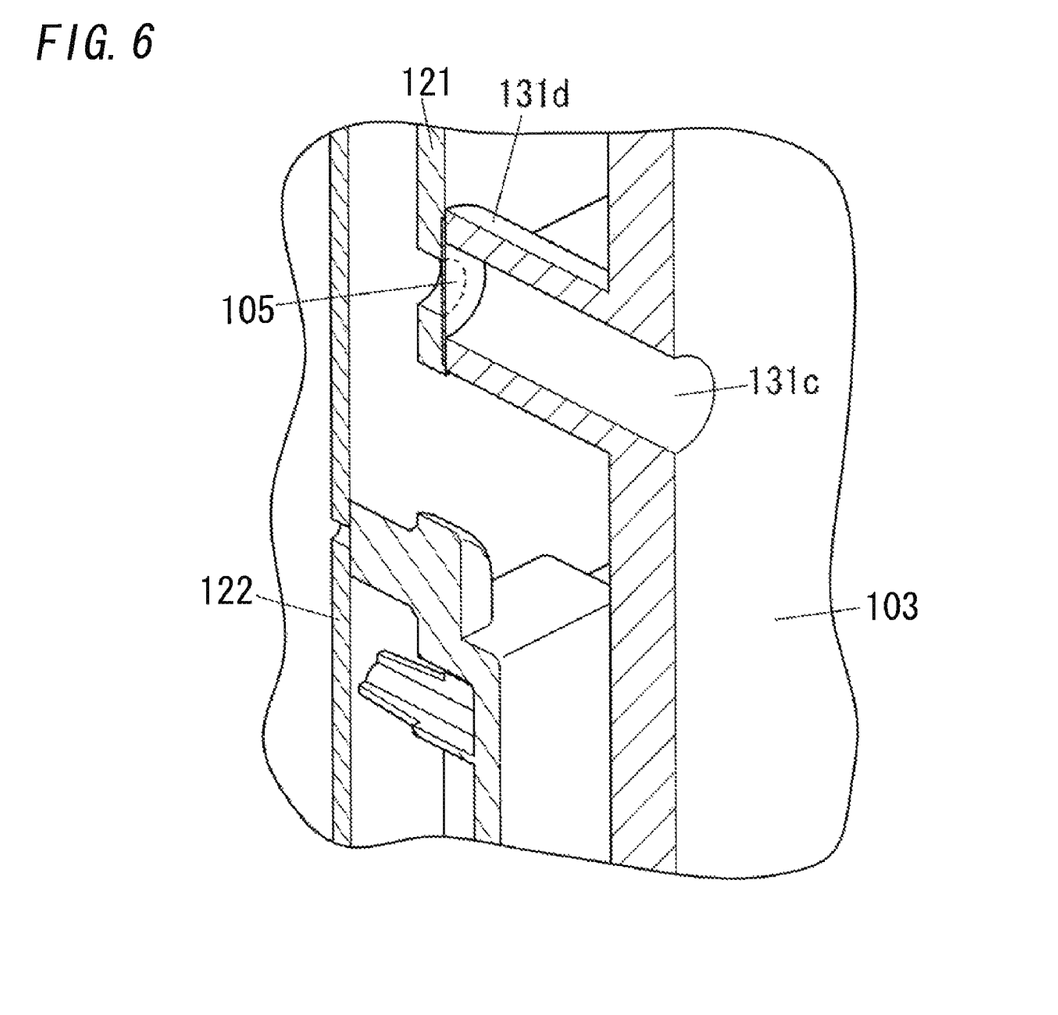
FIG. 6 is a cross-section view illustrating an essential part of said conventional electricity feeding control device.

By contrast, as shown in FIG. 6, there have been proposed an electricity feeding control device, of which the body 131 is provided in its internal wall with a straight-tube-shaped rib 131$d$. Then, the rib 131$d$ is penetrated through its inside from its distal end to an outer surface of the housing case 103, and to form thereby an air hole 131$c$ through which an air can pass between the inside and outside of the housing case 103. Also, an inner pressure adjusting sheet 105, which comprises a porous sheet etc. having breathability and waterproof property, is arranged so as to cover the air hole 131$c$ from the inside of the housing case 103, in order to prevent a foreign matter and a water (a water drop) from getting into the inside of the housing case 103 through the air hole 131$c$. Herein, if the temperature in the inside of the housing case 103 is higher than that in the outside of the housing case 103, an inner pressure of the housing case 103 increases, and an air in the inside of the housing case 103 flows out to the outside of the housing case 103 through the inner pressure adjusting sheet 105 and the air hole 131$c$. By contrast, if the temperature in the inside of the housing case 103 is lower than that in the outside of the housing case 103, the inner pressure of the housing case 103 decreases, and an air in the outside of the housing case 103 flows into the inside of the housing case 103 through the air hole 131$c$ and the inner pressure adjusting sheet 105. Thus, air ventilation is performed between the inside and outside of the housing case 103, and thereby can eliminate almost a temperature difference from the outside and the inside of the housing case 103. Therefore, the above electricity feeding control device can prevent the dew condensation from being generated within the housing case 103.

However, in the electricity feeding control device 100 having the configuration shown in FIG. 6, the air hole 131$c$ is formed into a straight-tube-shape, and thus an incident ultraviolet light from the outside of the housing case 103 is directly illuminated to the inner pressure adjusting sheet 105. As a result, there is a possibility that the inner pressure adjusting sheet 105 deteriorates due to the incidence of the ultraviolet light.

In addition, if an elongated rod (for example, a driver etc.) is accidentally inserted into the air hole 131$c$ from the outside of the housing case 103, upon maintenance etc., there is a possibility that the inner pressure adjusting sheet 105 is damaged by the contact of a distal end of the rod with the inner pressure adjusting sheet 105.

DISCLOSURE OF THE INVENTION

It is an object of the present invention to provide an electricity feeding control device, which can prevent deterioration and damage of an inner pressure adjusting sheet.

An electricity feeding control device of the present invention controls power feeding from an external power source to an electrical automobile comprising a battery and a charge circuit for charging the battery. Further, the electricity feeding control device comprises a housing case as an outer bailey. The housing case is provided in a part of its peripheral wall with an air hole formed by penetrating the part. The housing case is provided with an inner pressure adjusting sheet, which is formed with a breathable and waterproof member and is arranged so as to cover the air hole from the inside of the housing case. A channel of the air hole, led from the inside to the outside of the housing case, is formed into a nonlinear shape.

In this configuration, a channel of the air hole, led from the inside to the outside of the housing case, is formed into a nonlinear shape, and thereby can prevent an incident ultraviolet light from the outside of the housing case from being illuminated to the inner pressure adjusting sheet, and then can prevent the inner pressure adjusting sheet from deteriorating due to the incidence of the ultraviolet light. Also, since the channel of the air hole is formed into a nonlinear shape, even if an elongated rod (for example, a driver etc.) is accidentally inserted into the air hole from the outside of the housing case, upon maintenance etc, the distal end of the rod hits a inner surface of the air hole and can not get into the inside of the housing case through the air hole. That is, there is no possibility that the distal end of the rod contacts the inner pressure adjusting sheet. Therefore, the electricity feeding control device can prevent damage of the inner pressure adjusting sheet.

As a preferred embodiment, the electricity feeding control device comprises a relay, a leakage detection means, and a control means. The relay opens and closes a power feeding channel leading from the external power source to the charge circuit. The leakage detection means detects a leakage based on a current flowing in the power feeding channel. The control means is configured to switch off the relay to block thereby the power feeding channel when the leakage is detected by the leakage detection means. The housing case houses the relay, the leakage detection means and the control means. The channel of the air hole, led from the inside to the outside of the housing case, is formed into a hook shape.

In this configuration, a channel of the air hole, led from the inside to the outside of the housing case, is formed into a hook shape, and thereby can prevent an incident ultraviolet light from the outside of the housing case from being illuminated to the inner pressure adjusting sheet certainly, and then can prevent the inner pressure adjusting sheet from deteriorating due to the incidence of the ultraviolet light. Also, since the channel of the air hole is formed into a hook shape, even if an elongated rod (for example, a driver etc.) is accidentally inserted into the air hole from the outside of the housing case, upon maintenance etc, the distal end of the rod hits a inner surface of the air hole and can not get into the inside of the housing case through the air hole certainly. That is, there is no possibility that the distal end of the rod contacts the inner pressure adjusting sheet. Therefore, the electricity feeding control device can prevent damage of the inner pressure adjusting sheet.

As a more preferred embodiment, the air hole comprises a long recess formed in an outer surface of the housing case, a communicating hole, and a shielding plate. The communicating hole is consecutively formed in one end of a longitudinal direction of the recess and is communicated with an inner surface of the housing case. The shielding plate is attached in the outer surface of the housing case so as to cover a region other than the other end of the longitudinal direction of the recess, in a region of an opening section of the recess.

In this configuration, the air hole comprises a long recess formed in an outer surface of the housing case, a communicating hole consecutively formed in one end of a longitudinal direction of the recess and commu-nicated with an inner surface of the housing case, and a shielding plate attached in the outer surface of the housing case so as to cover a region other than the other end of the longitudinal direction of the recess, in a region of an opening section of the recess. Therefore, when the housing case is formed by a resin molding, a configuration of a metallic mold used in the molding can be simplified, and the electricity feeding control device can be manu-factured more easily, as compared with a case in which one tube-shaped air hole inflected into a hook-shape is formed within the peripheral wall of the housing case.

As a more preferred embodiment, an opening of the air hole, in an outer surface side of the housing case, is covered with a member having mesh construction.

In this configuration, an opening of the air hole, in an outer surface side of the housing case, is covered with a member having mesh construction, and thereby can prevent a foreign matter from getting into the air hole from the outside. Therefore, the electricity feeding control device can prevent an occurrence of a problem that an inner pressure adjustment becomes impo-ssible in the housing case due to a blockage of the air hole with the foreign matter. Also, since the electricity feeding control device can prevent the foreign matter from getting into the air hole from the outside, the inner pressure adjusting sheet can be prevented from being damaged by the contact of the foreign matter with the inner pressure adjusting sheet.

As a more preferred embodiment, the electricity feeding control device comprises a relay, a leakage detection means, and a control means. The relay opens and closes a power feeding channel leading from the external power source to the charge circuit. The leakage detection means detects a leakage based on a current flowing in the power feeding channel. The control means is configured to switch off the relay to block thereby the power feeding channel when the leakage is detected by the leakage detection means. The housing case houses the relay, the leakage detection means and the control means. The channel of the air hole, led from the inside to the outside of the housing case, is formed into an L-shape.

In this configuration, a channel of the air hole, led from the inside to the outside of the housing case, is formed into an L-shape, and thereby can prevent an incident ultraviolet light from the outside of the housing case from being illuminated to the inner pressure adjusting sheet certainly, and then can prevent the inner pressure adjusting sheet from deteriorating due to the incidence of the ultraviolet light. Also, since the channel of the air hole is formed into an L-shape, even if an elongated rod (for example, a driver etc.) is accidentally inserted into the air hole from the outside of the housing case, upon maintenance etc, the distal end of the rod hits a inner surface of the air hole and can not get into the inside of the housing case through the air hole certainly. That is, there is no possibility that the distal end of the rod contacts the inner pressure adjusting sheet. Therefore, the electricity feeding control device can prevent damage of the inner pressure adjusting sheet.

BRIEF DESCRIPTION OF THE DRAWINGS

Preferred embodiments of the invention will now be described in further details. Other features and advantages of the present invention will become better understood with regard to the following detailed description and accompanying drawings where:

FIGS. 3A and 3B illustrate said electricity feeding control device according to said embodiment, wherein

BEST MODE FOR CARRYING OUT THE INVENTION

An electricity feeding control device according to an embodiment is explained below with reference to FIGS. 1 to 3.

Figure 2:
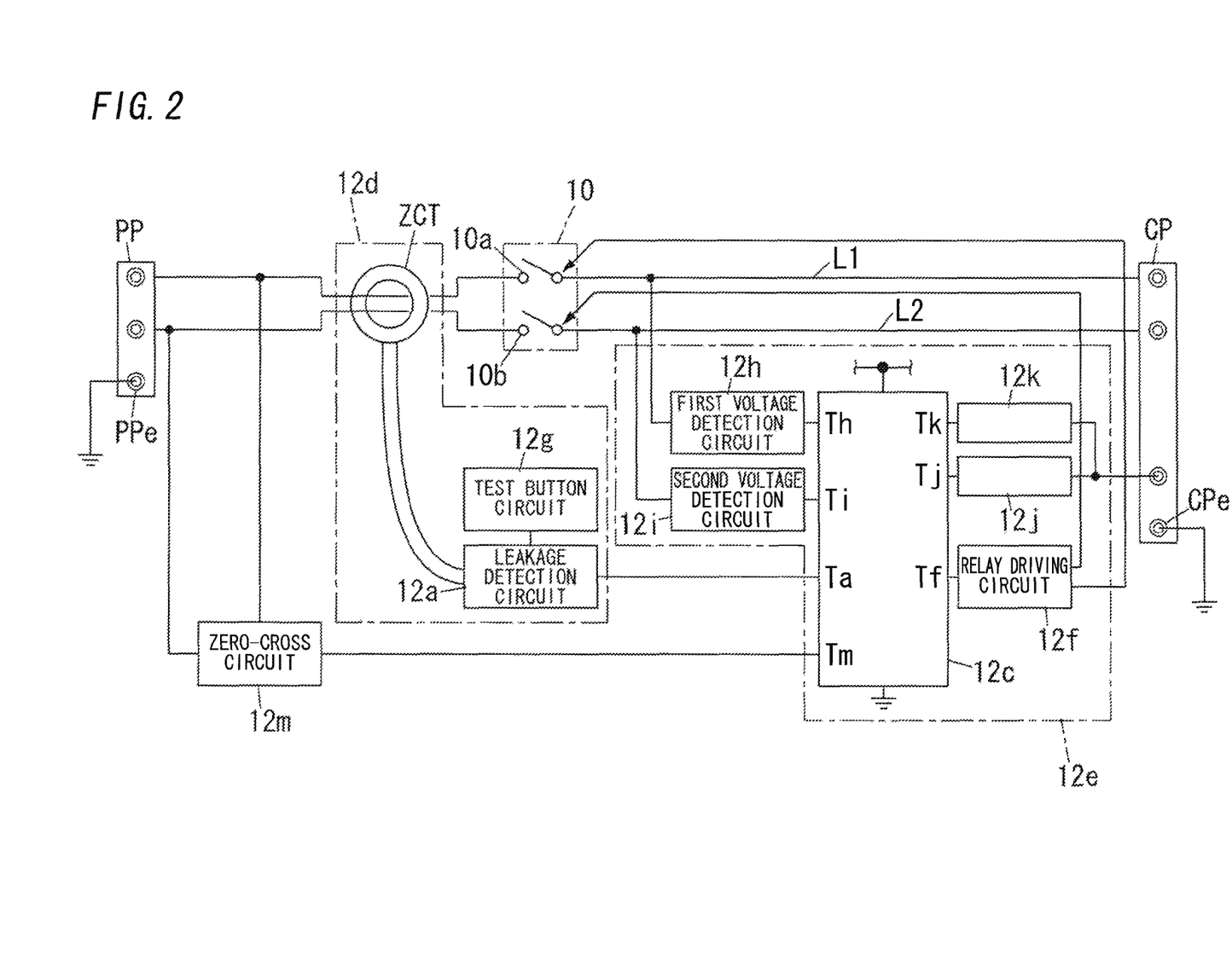
FIG. 2 is a schematic circuit diagram of said electricity feeding control device according to said embodiment.
Figure 3A:
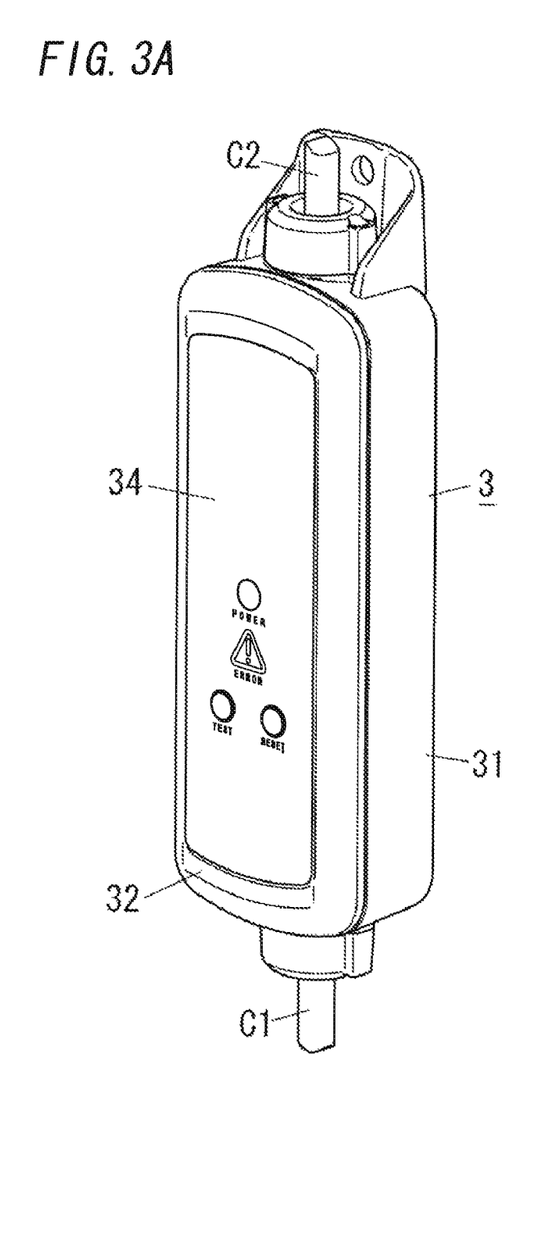
FIG. 3A is an entire perspective view illustrating the configuration as looking from diagonally forward.
Figure 3B:
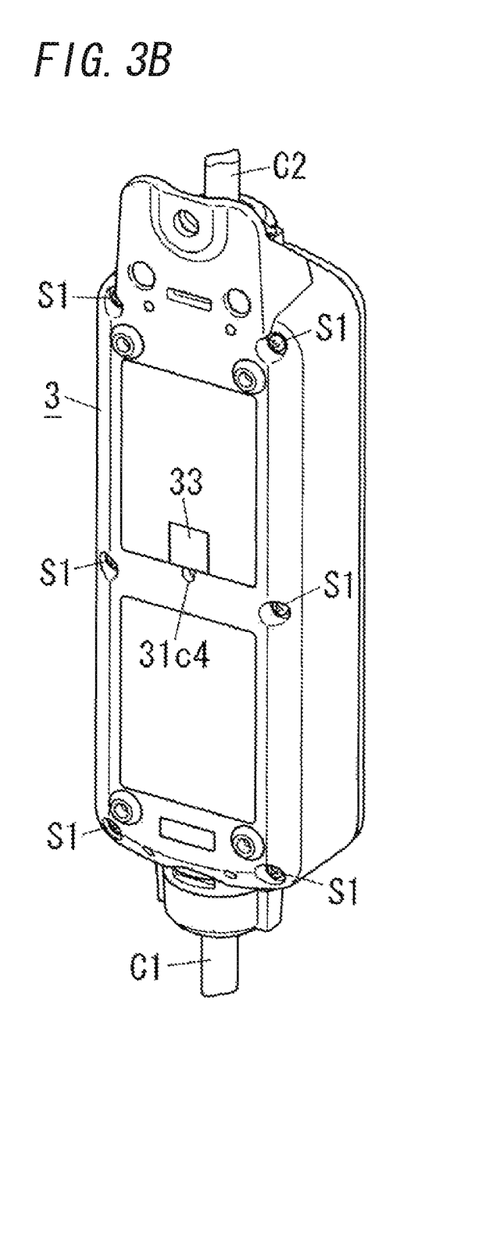
FIG. 3B is an entire perspective view illustrating the configuration as looking from diagonally backward.

The electricity feeding control device according to the embodiment, as shown in FIGS. 2 and 3, controls power feeding from an external power source (not shown) to an electrical automobile (not shown) comprising a battery (not shown) and a charge circuit (not shown) for charging the battery. Then, the electricity feeding control device comprises a relay 10, a leakage detection section 12d, a control section 12e, and a housing case 3. The relay 10 opens and closes a first power feeding line L1 and a second power feeding line L2, which constitute a part of a power feeding channel leading from the external power source to the electrical automobile. The leakage detection section 12d is a leakage detection means detecting a leakage based on a current flowing in the first and second power feeding lines L1, L2. The control section 12e is a control means which switches off the relay 10 to block thereby the first and second power feeding lines L1, L2 when the leakage detection section 12d detects the leakage. The housing case 3 houses the relay 10, the leakage detection section 12d, and the control section 12e.

Further, the electricity feeding control device, having the configu-ration shown in FIG. 2, comprises a power side plug PP connected to the external power source, such as a commercial AC power source, via a first cable C1, a car side plug CP connected to the charge circuit via a second cable C2, and the first and second power feeding lines L1, L2 through which the power side plug PP is electrically connected to the car side plug CP. In addition, the control section 12e is connected to a power section (not shown), for supplying electrical power to the control section 12e, via a power supply line L5. The power side plug PP is provided with a ground terminal PPe which is grounded. The car side plug CP is provided with a ground terminal CPe which is grounded. Herein, these ground terminals PPe, CPe are connected each other through a grounding wire (not shown).

The relay 10 is connected to the below-described relay driving circuit 12f. If there is not an input of the relay control signal outputted from the relay driving circuit 12f, relay contacts 10a, 10b are maintained to switch off. By contrast, if there is the input of the relay control signal, the relay contacts 10a, 10b are switched on.

The leakage detection section 12d comprises a residual current transformer ZCT, a leakage detection circuit 12a, and a test button circuit 12g. The residual current transformer ZCT is penetrated by the first and second power feeding lines L1, L2. The leakage detection circuit 12a detects a leakage based on the output of the residual current transformer ZCT. The test button circuit 12g comprises a test button (not shown) which is operated for testing whether or not the first and second power feeding lines L1, L2 are blocked certainly, by generating a simulated leakage state. In addition, the leakage detection section 12d outputs a leakage detection signal to the below-described CPU 12c, when detecting a generation of the leakage.

The control section 12e comprises a first voltage detection circuit 12h which detects a voltage of the first power feeding line L1, a second voltage detection circuit 12i which detects a voltage of the second power feeding line L2, a pilot signal outputting circuit 12j, a pilot signal inputting circuit 12k, the relay driving circuit 12f for driving the relay 10, and the CPU 12c. The pilot signal outputting circuit 12j generates to output a pilot signal (CPLT) for controlling to switch on/off the relay 10. The pilot signal inputting circuit 12k detects a voltage of the pilot signal outputted from the pilot signal outputting circuit 12j, and outputs a voltage detection signal, corresponding to the detected voltage of the pilot signal, to the CPU 12c. The CPU 12c is connected to the first and second voltage detection circuits 12h, 12i, the pilot signal outputting and inputting circuits 12j, 12k, and the relay driving circuit 12f.

The control section 12e comprises an error occurrence display circuit (not shown) which has an error occurrence indicating light 41 (see FIG. 1) comprising a LED putting the light on upon the leakage detection of the leakage detection section 12d. When the leakage detection signal outputted from the leakage detection section 12d is inputted to the CPU 12c via a leakage detection input terminal Ta, the CPU 12c causes the error occurrence display circuit to light the error occurrence indicating light 41. Also, the control section 12e comprises a power feeding state display circuit (not shown) which has a power feeding state indicating light 42 (see FIG. 1) comprising a LED putting the light while charging the charge circuit of the electrical automobile. If the CPU 12c determines that the battery of the electrical automobile is being charged now, based on the voltage detection signal inputted from the pilot signal inputting circuit 12k via the below-described pilot signal input terminal Tk, the CPU 12c causes the power feeding state display circuit to light power feeding state indicating light 42.

The CPU 12c comprises a first voltage detection input terminal Th which is electrically connected to the first voltage detection circuit 12h, a second voltage detection input terminal Ti which is electrically connected to the second voltage detection circuit 12i, a pilot signal output terminal Tj which is electrically connected to the pilot signal outputting circuit 12j, a pilot signal input terminal Tk which is electrically connected to the pilot signal inputting circuit 12k, a relay driving output terminal Tf which is electrically connected to the relay driving circuit 12f, a leakage detection input terminal Ta which is electrically connected to the leakage detection circuit 12a, and a zero-cross input terminal Tm which is electrically connected to a zero-cross circuit 12m. The CPU 12c causes the relay driving circuit 12f to output the relay control signal, based on inputs from the first and second voltage detection circuits 12h, 12i, and the pilot signal inputting circuit 12k. In addition, the CPU 12c is connected to the power supply line L5, derived from the power section, and the grounding wire. The CPU 12c gets the power feeding from the power section through the power supply line L5.

The CPU 12c causes the pilot signal outputting circuit 12j to output the pilot signal, and obtains a voltage of the pilot signal based on the voltage detection signal inputted from the pilot signal inputting circuit 12k, and then determines, based on the obtained voltage of the pilot signal, whether or not the charge circuit is connected to the car side plug CP via the first cable C1, or whether or not a charge of the battery is completed, or whether or not the charge circuit can be fed the power from the electricity feeding control device.

For instance, when a voltage of the pilot signal is 12 V, the CPU 12c determines that the charge circuit is not connected to the car side plug CP. When the voltage of the pilot signal is 9

V, the CPU 12c determines that the charge of the battery is completed. When the voltage of the pilot signal is 6 V, the CPU 12c determines that the battery is charging now. When the voltage of the pilot signal is 0 V, the CPU 12c determines that the charge circuit can not be fed the power from the electricity feeding control device.

When the leakage detection section 12d detects the leakage and then the leakage detection signal is inputted from the leakage detection circuit 12a to the leakage detection input terminal Ta, the CPU 12c cause the relay driving circuit 12f, connected to the relay driving output terminal Tf, to maintain in a state where the relay 10 is switched off, and to maintain in a state where the first and second power feeding lines L1, L2 are blocked. Then, a reset button circuit (not shown) is connected to the CPU 12c and comprises a reset button (not shown), which is operated in order to cancel the state where the first and second power feeding lines L1, L2 are blocked.

The power section is connected to the first and second power feeding lines L1, L2, and is fed the power from the external power source through the first and second power feeding lines L1, L2, and supplies the power to the control section 12e.

The zero-cross circuit 12m is connected to the first and second power feeding lines L1, L2. Then, when the zero-cross circuit 12m detects a zero-cross point of AC voltage between the first and second power feeding lines L1, L2, a voltage is inputted to the zero-cross input terminal Tm. The CPU 12c determines the presence or absence of the power feeding, from the external power source to the power side plug PP, based on the voltage inputted to the zero-cross input terminal Tm.

The electricity feeding control device of the present embodiment comprises a first base plate 21 comprising the relay 10, the residual current transformer ZCT, the power section, the power side plug PP and the car side plug CP, and a second base plate 22 comprising the control section 12e, the leakage detection circuit 12a, the test button circuit 12g and zero-cross circuit 12m.

The housing case 3 comprises a body 31 which is formed into a box-shape and of which one face is opened, and a cover 32 which is attached to the opened one face of the body 31 with attachment screws S1, so as to cover the opened one face. The body 31 is provided in a part of its peripheral wall with an air hole 31c through which an air can pass between the inside and outside of the housing case 3.

The body 31 is formed with a synthetic resin into a box-shape of a rectangular parallelepiped and of which one face is opened. In the inside of the body 31, ribs (not shown) are projected at four corners and at near both lateral walls of a central part in a longitudinal direction of the body 31, respectively. The ribs are penetrated along their longitudinal directions, respectively, and thereby screw insert holes (not shown) are formed. Herein, the attachment screws S1 are inserted to the screw inset holes, respectively, for an attachment of the cover 32 to the body 31.

The cover 32 is formed with a synthetic resin into a rectangular-shape in a planar view. In the cover 32's inner surface facing the body 31, ribs (not shown) are projected at positions corresponding to the projected ribs of the body 31, respectively. The ribs of the cover 32 are drilled along their longitudinal directions, respectively, and thereby screw holes (not shown) are formed. Herein, the attachment screws S1, inserted to the screw insert holes, are screwed to the screw holes, respectively. Thus, in a state where the cover 32 is placed on the one face of the body 31, the attachment screws S1 inserted to the screw insert holes of the body 31 is screwed to the screw holes of cover 32, respectively, and thereby the cover 32 is fixed to the body 31. In addition, the cover 32 is provided with four insert holes 32a which are formed by penetration. The four insert holes 32a are formed at positions, respectively, corresponding to the power feeding state indicating light 42, the error occurrence indicating light 41, and the above-mentioned reset and test buttons, which are located in the second base plate 22 facing the cover 32. Thus, it is possible to have visual contact with lighting of the power feeding state indicating light 42 and the error occurrence indicating light 41, from the cover 32's side on the opposite side of the body 31 (that is, from a front side of the cover 32), through these insert holes 32a. Further, it is possible to operate, from the front side of the cover 32, the reset button and the test button. In the front side of the cover 32, a design sheet 34 and a transparent sheet 35 are fixed so as to cover the four insert holes 32a. The design sheet 34 is formed with a resin material having flexibility. Some letters, showing positions of the power feeding state indicating light 42 and the error occurrence indicating light 41 and positions of the reset and test buttons, respectively, are printed on the design sheet 34. The transparent sheet 35 is formed with a translucent resin material having flexibility, and is located between the design sheet 34 and the cover 32. In the transparent sheet 35, packing members (not shown) are located at positions correspond-ing to the reset button and the test button, respectively, so as to intervene between the transparent sheet 35 and the cover 32. Herein, in the electricity feeding control device of the present embodiment, a user can push down positions, of the design sheet 34, corresponding to the insert holes 32a from the front side of the cover 32, and thus can operate the reset button and the test button.

In the body 31, an inner pressure adjusting sheet 5, formed with a breathable and waterproof member, is arranged so as to cover the air hole 31c from the inside of the body 31. Therefore, the electricity feeding control device can prevent a foreign matter and a water (a water drop) from getting into the inside of the housing case 3 through the air hole 31c.

For instance, a sheet-shaped fluorine resin porous film is used as the inner pressure adjusting sheet 5. Then, TEMISH (registered mark), being tetrafluoroethylene resin porous film, is known as such fluorine resin porous film. The TEMISH has a micro porous which is about 0.1 μm to 10 μm in diameter, and thus is formed so that a foreign matter and a water drop, which are about 100 μm to 3000 μm in diameter, can not get into the inside of the housing case 3, but an air and a vapor can get into the inside. That is, the TEMISH has breathability and waterproof property.

Figure 1:
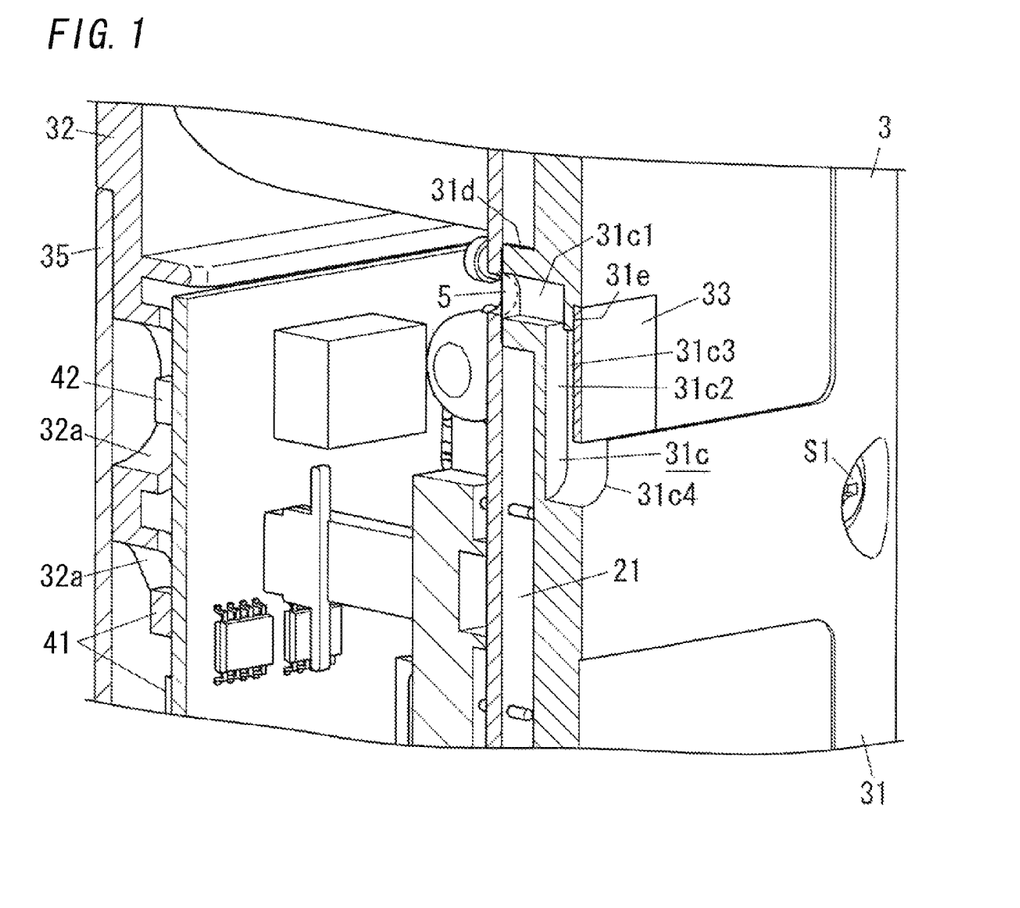
FIG. 1 is a cross-section view illustrating an essential part of an electricity feeding control device according to an embodiment of the present invention.

By the way, in the electricity feeding control device of the present embodiment, as shown in FIG. 1, a channel of the air hole 31c, led from the inside to the outside of the housing case 3, is formed into a nonlinear shape (for example, a hook shape). Herein, the above-mentioned hook shape means, for example, a shape consisting of a long horizontal-hole extended along an outer surface of the body 31, in the inside of a peripheral wall of the body 31 constituting a part of the housing case 3, a first vertical-hole formed in one end of a longitudinal direction of the horizontal-hole to and communicated with an inner surface of the body 31, and a second vertical-hole formed in the other end of the longitudinal direction of the horizontal-hole to and communicated with an outer surface of the body 31. In addition, as shown in FIG. 1, the horizontal-hole corresponds to a region surrounded by an inner surface of the below-described recess 31c2, and a surface of the below-described shielding plate 33, facing the recess 31c2, with respect to a thickness direction of the below-described shielding plate 33. The first vertical-hole corresponds to the below-described communicating hole 31c1. The second vertical-hole corresponds to a region surrounded by an inner surface of the below-described recess 31c2 and an edge face of the below-described shielding plate 33.

Then, such a configuration can prevent an ultraviolet light, from the outside of the housing case 3, from being illuminated to the inner pressure adjusting sheet 5, and thus can prevent the inner pressure adjusting sheet 5 from deteriorating due to the incidence of the ultraviolet light. Further, even if an elongated rod (for example, a driver and a wrench etc. used for removing the attachment screws S1) is accidentally inserted into the air hole 31c from the outside of the housing case 3 when the cover 32 is removed from the body 31 upon maintenance etc., the distal end of the rod hits a inner surface of the air hole 31c and can not get into the inside of the housing case 3 through the air hole 31c, as a result. That is, there is no possibility that the distal end of the rod contacts the inner pressure adjusting sheet 5. Therefore, the electricity feeding control device can prevent damage of the inner pressure adjusting sheet 5.

As shown in FIG. 1, the air hole 31c comprises a long recess 31c2 formed in a outer surface side of the body 31 constituting a part of the housing case 3, a communicating hole 31c1 consecutively formed in one end of a longitudinal direction of the recess 31c2 and communicated with an inner surface of the body 31, and a shielding plate 33 attached in the outer surface of the body 31 so as to cover a region other than the other end of the longitudinal direction of the recess 31c2, in a region of an opening section 31c3 of the recess 31c2. Then, in the air hole 31c, an opening 31c4 of an outer surface side of the body 31 is a region, of the recess 31c2, which is not covered by the shielding plate 33.

The shielding plate 33 is formed into a rectangular-shape in a planar view, and is fixed to an outer surface of the body 31 by fitting into a recess 31e formed in a peripheral part of the recess 31c2, in the outer surface of the body 31. Then, the shielding plate 33 is fixed with, for example, an adhesion bond etc. into the outer surface of the body 31.

Then, when the body 31, constituting a part of housing case 3, is formed by a resin molding, a configuration of a metallic mold used in the molding can be simplified, and the electricity feeding control device can be manufactured more easily, as compared with a case in which one tube-shaped air hole (not shown) inflected into a hook-shape is formed within the peripheral wall of the body 31.

In the electricity feeding control device of the present embodiment, it's preferred that the opening 31c4, of the air hole 31c, in the outer surface side of the housing case 3, is covered with a member (not shown) having mesh construction.

The member having mesh construction is formed with a synthetic resin, and comprises a pore of which a diameter is larger than that of the micro porous formed within the fluorine resin porous film constituting the inner pressure adjusting sheet 5.

Then, the electricity feeding control device can prevent the foreign matter from getting into the air hole 31c from the outside. Therefore, the electricity feeding control device can prevent an occurrence of a problem that an inner pressure adjustment becomes impossible in the housing case 3 due to a blockage of the air hole 31c with the foreign matter. Also, since the electricity feeding control device can prevent the foreign matter from getting into the air hole 31c from the outside, the inner pressure adjusting sheet 5 can be prevented from being damaged by the contact of the foreign matter with the inner pressure adjusting sheet 5.

Although the present invention has been described with reference to certain preferred embodiments, numerous modifications and variations can be made by those skilled in the art without departing from the true spirit and scope of this invention, namely claims.

The invention claimed is:

1. An electricity feeding control device, controlling power feeding from an external power source to an electrical automobile comprising a battery and a charge circuit for charging the battery, comprising a housing case as an outer bailey,
    wherein the housing case is provided in a part of its peripheral wall with an air hole formed by penetrating the part, the housing case provided with an inner pressure adjusting sheet, which is formed with a breathable and waterproof member and is arranged so as to cover the air hole from the inside of the housing case,
    wherein a channel of the air hole, led from the inside to the outside of the housing case, is formed into a nonlinear shape,
    wherein the electricity feeding control device further comprises a relay opening and closing a power feeding channel leading from the external power source to the charge circuit; a leakage detection means detecting a leakage based on a current flowing in the power feeding channel; and a control means being configured to switch off the relay to block thereby the power feeding channel when the leakage is detected by the leakage detection means, wherein the housing case houses the relay, the leakage detection means and the control means, and
    wherein the air hole comprises a long recess formed in an outer surface of the housing case, a communicating hole consecutively formed in one end of longitudinal direction of the recess and communicated with an inner surface of the housing case, and a shielding plate attached in the outer surface of the housing case so as to cover a region other than the other end of the longitudinal direction of the recess, in a region of an opening section of the recess.

2. The electricity feeding control device according to claim 1,
    wherein the channel of the air hole, led from the inside to the outside of the housing case, is formed into a book shape.

3. The electricity feeding control device according to claim 2, wherein an opening of the air hole, in an outer surface side of the housing case, is covered with a member having mesh construction.

4. The electricity feeding control device according to claim 1, further comprising:
    wherein the channel of the air hole, led from the inside to the outside of the housing case, is formed into an L-shape.

5. The electricity feeding control device according to claim 1, wherein an opening of the air hole, in an outer surface side of the housing case, is covered with a member having mesh construction.

* * * * *